July 30, 1929.  G. W. MOFFITT  1,722,964
COINCIDENCE PRISM
Filed Feb. 24, 1926    2 Sheets-Sheet 1

Inventor
George W. Moffitt
By W. N. Roach
Attorney.

July 30, 1929.   G. W. MOFFITT   1,722,964
COINCIDENCE PRISM
Filed Feb. 24, 1926    2 Sheets-Sheet 2

Inventor
George W. Moffitt
By W. N. Roach
Attorney

Patented July 30, 1929.

1,722,964

UNITED STATES PATENT OFFICE.

GEORGE W. MOFFITT, OF PHILADELPHIA, PENNSYLVANIA.

COINCIDENCE PRISM.

Application filed February 24, 1926. Serial No. 90,435.

(GRANTED UNDER THE PROVISIONS OF THE ACT OF MARCH 3, 1883, AS AMENDED APRIL 30, 1928; 370 O. G. 757.)

The invention described herein may be manufactured and used by or for the Government for governmental purposes without the payment to me of any royalty thereon.

This invention relates to coincidence prisms especially applicable to base telemeters though not restricted to this class of instruments.

In short base telemeters designed for military purposes it is highly desirable that the instrument be of such outside diameter that it may be readily picked up and carried with one hand and this determination calls for a compactly arranged coincidence prism. With the type of coincidence prisms heretofore used, this condition can not be fulfilled without decentering the optical tube or resorting to mechanical design which would weaken the instrument and make assembly and repair a difficult task.

The principal object of the invention then is to provide a compact coincidence prism which may be entirely mounted in an optical tube of small diameter without decentering the tube or imposing undesirable mechanical construction and while still retaining the optical centers of the receiving prisms in coincidence with the optical axis of the telemeter.

Another object is to provide a simple and easily constructed coincidence prism in which the base prism which is susceptible for mounting the unit carries two smaller receiving prisms and serves to deflect the beam from one of these prisms into the other prism whose emergent face is so disposed that the ocular associated therewith may be inclined for convenience in observation.

To these and other ends, my invention consists in the construction, arrangement, and combination of elements, described hereinafter and pointed out in the claims forming a part of this specification.

A practical embodiment of my invention is illustrated in the accompanying drawings, wherein.

Figure 1:
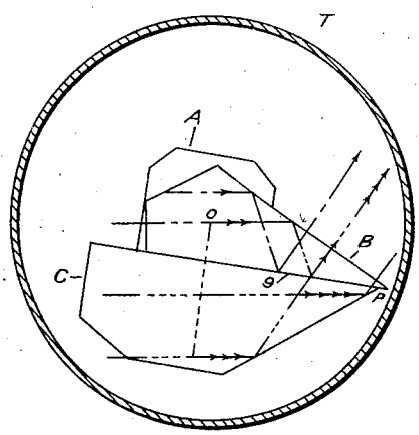
Fig. 1 is a transverse sectional view through the optical tube of a telemeter showing the disposition of my improved coincidence prism.

Referring to the drawings by characters of reference:

The prism system comprises two reflecting receiving prisms A and B disposed in the optical axis of the tube T and attached by means of one of their sides on the upper face of a third and larger base reflecting prism C whose form and disposition in the tube determines the diameter of the tube. The base prism is formed with a view towards mounting of the system and accordingly, the portions designated by the circles 10 on the upper face indicate the areas of contact of the prism with the reference surface of its metal holder, the prism being held against this reference seat by spring action applied to the bottom face of the prism, and its three corners 11 ground to receive positioning screws for holding it against projections touching the face 4 near its ends to prevent lateral displacement of the prism on its seat.

Figure 2:
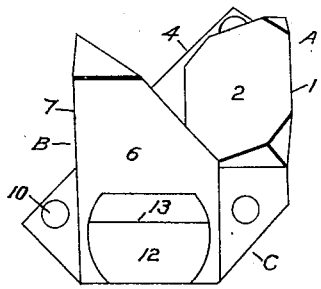
Fig. 2 is a perspective of the prism as viewed normally to the emergent face.
Figure 3:
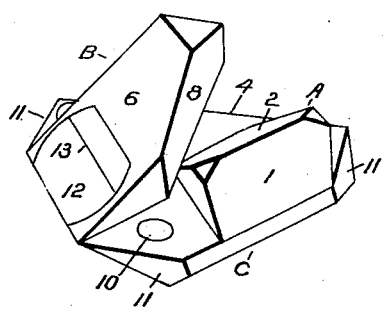
Figs. 3 to 6 are perspectives of the prism as viewed from above.
Figure 4:
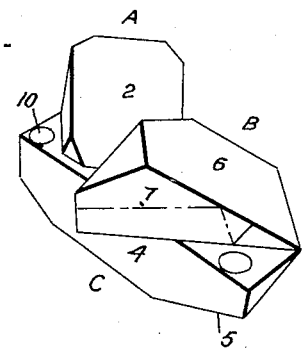
Figure 5:
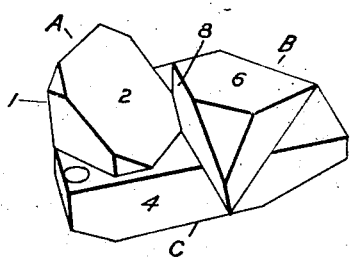
Figure 6:
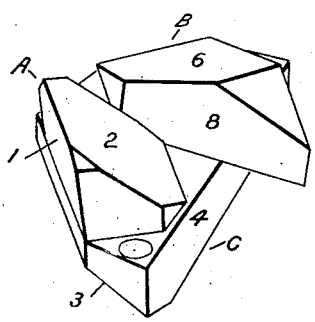
Figure 7:
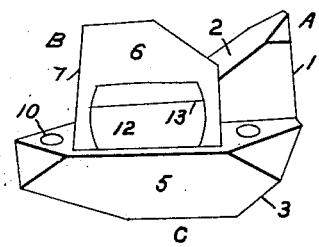
Figs. 7 to 10 are elevational views of the prism.
Figure 8:
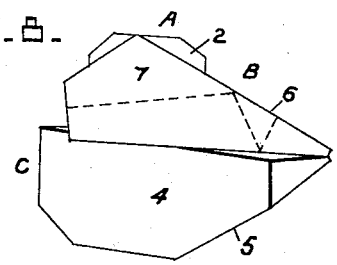
Figure 9:
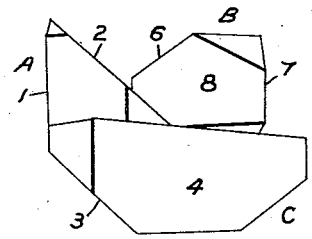
Figure 10:
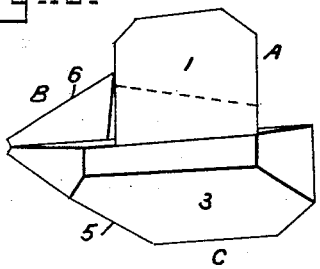
Figure 12:
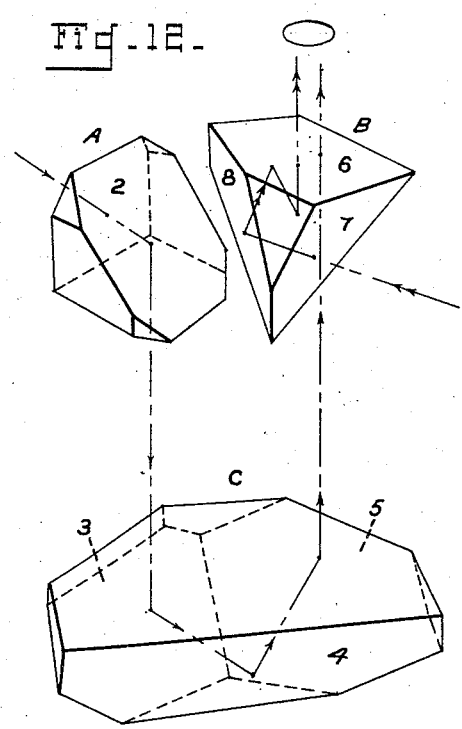
Fig. 12 is a view of the prism system separated and showing the paths of the light rays.
Figure 11:
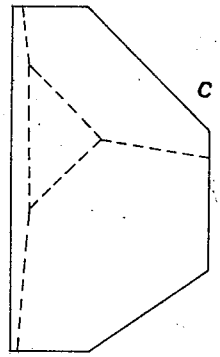
Fig. 11 is a top plan of the base reflecting prism.

It will be noted by referring to Fig. 2 that the longest side or edge of the base prism is oblique to the axis of the tube, and this disposition is made so that the optical centers of both prisms A and B may be in coincidence with the optical axis of the telemeter while still providing ample attaching surface for said prisms without extending laterally beyond the outermost edge of the prism B whose radial distance OP (Fig. 1) is the ultimate factor governing the size of the optical tube T.

The oblong area designated by 12 on the emergence face 6 of the prism B indicates the projection of the field stop of the instrument, the portion beneath the dividing line 13 containing an erect image and the upper portion an inverted image. The paths of the light rays which are collected by the system of prisms and directed to the ocular will be made clear by following the course of the axial ray from the objective lens at each end of the base telemeter.

The ray from the right objective lens is incident on the face 1 of the receiving prism A and being normal to this surface it enters the prism without refraction and is totally reflected downward in a transverse vertical plane by the face 2, but making an angle of 9° in one of the best forms, until it strikes the face 3 of the base prism. The ray is then successively totally reflected by the faces 3 and 4 and then reflected by the face 5 upward at an angle passing the edge of the silvered strip 9 on the lower face of the prism B and finally emerging from the face 6 of that prism in a direction normal to that face. The light that takes the course described forms a fully erected image in the lower portion of the field of view, the edge of the silvered area 9 forming the dividing line 13 in the field.

Considering the left objective of the instrument, the axial ray enters the face 7 of the receiving prism B undeviated and is successively totally reflected by the faces 8 and 6 to the silvered area 9. From the silver, the ray is reflected and emerges normal to the face 6. Light taking this course forms an inverted but not a reversed image in the upper portion of the field of view.

It will be noted that by reason of the disposition of the component prisms and the slightly inclined mounting of the system that the emergent beams are directed into the ocular at a very convenient angle for observation.

By referring to Fig. 1 it will be noted that the under faces of the base prism conform roughly to the contour of the optical tube and this in conjunction with the functions performed by the prism B by which its radial distance is kept small is favorable to placing the system entirely within an optical tube of moderate diameter.

While experimentations have shown that there is some flexibility in the choice of angles for this prism, those shown are the most suitable when all factors are taken into consideration.

While in the foregoing there has been illustrated and described such combination and arrangement of elements as constitute the preferred embodiment of the invention, it is nevertheless desired to emphasize the fact that interpretation of the invention should only be conclusive when made in the light of the subjoined claims.

I claim:

1. A base telemeter including an optical tube, a coincidence prism entirely within said tube, said prism comprising an obliquely positioned large reflecting base prism and two smaller receiving prisms having undivided reflecting surfaces mounted on the upper face of said base prism, the optical centers of said smaller prisms being coincident with the optical axis of the tube.

2. A base telemeter including an optical tube, a coincidence prism within said tube, said prism comprising a single base reflecting prism and two receiving reflecting prisms mounted on the upper face of said base prism, the optical centers of said receiving prisms being coincident with the optical axis of the tube.

3. A coincidence prism system comprising a large base prism having three reflecting surfaces and two smaller receiving prisms mounted on the base prism and having co-axial optical centers, one of said receiving prisms being the collecting prism and having three reflecting surfaces presenting in emergence an inverted image and the other receiving prism being a right angle prism and cooperating with the reflecting surfaces of the base prism in presenting an erect and unreversed image emergent through the collecting prism.

4. A coincidence prism system comprising a large base reflecting prism and two smaller receiving prisms mounted on the base prism and having co-axial optical centers, said receiving prisms having undivided reflecting surfaces.

5. A coincidence prism comprising a reflecting receiving prism having an emergent face inclined with respect to its mounting, a second reflecting receiving prism having its optical center co-axial with the center of the first prism, and a prism having reflecting surfaces for directing the image reflected by the second prism through the emergent face of the first prism.

6. A coincidence prism comprising a receiving prism having reflecting surfaces presenting an inverted image by reflection within itself, a second right angle receiving prism co-axial with the first prism, and a prism having reflecting surfaces cooperating with the right angle prism in directing an erect and unreversed image through the first prism and parallel with its image.

GEORGE W. MOFFITT.